June 14, 1932.  C. F. LOGAN ET AL  1,863,329
INSULATING PRODUCT AND METHOD OF PRODUCING SAME
Filed Aug. 22, 1930  4 Sheets-Sheet 1
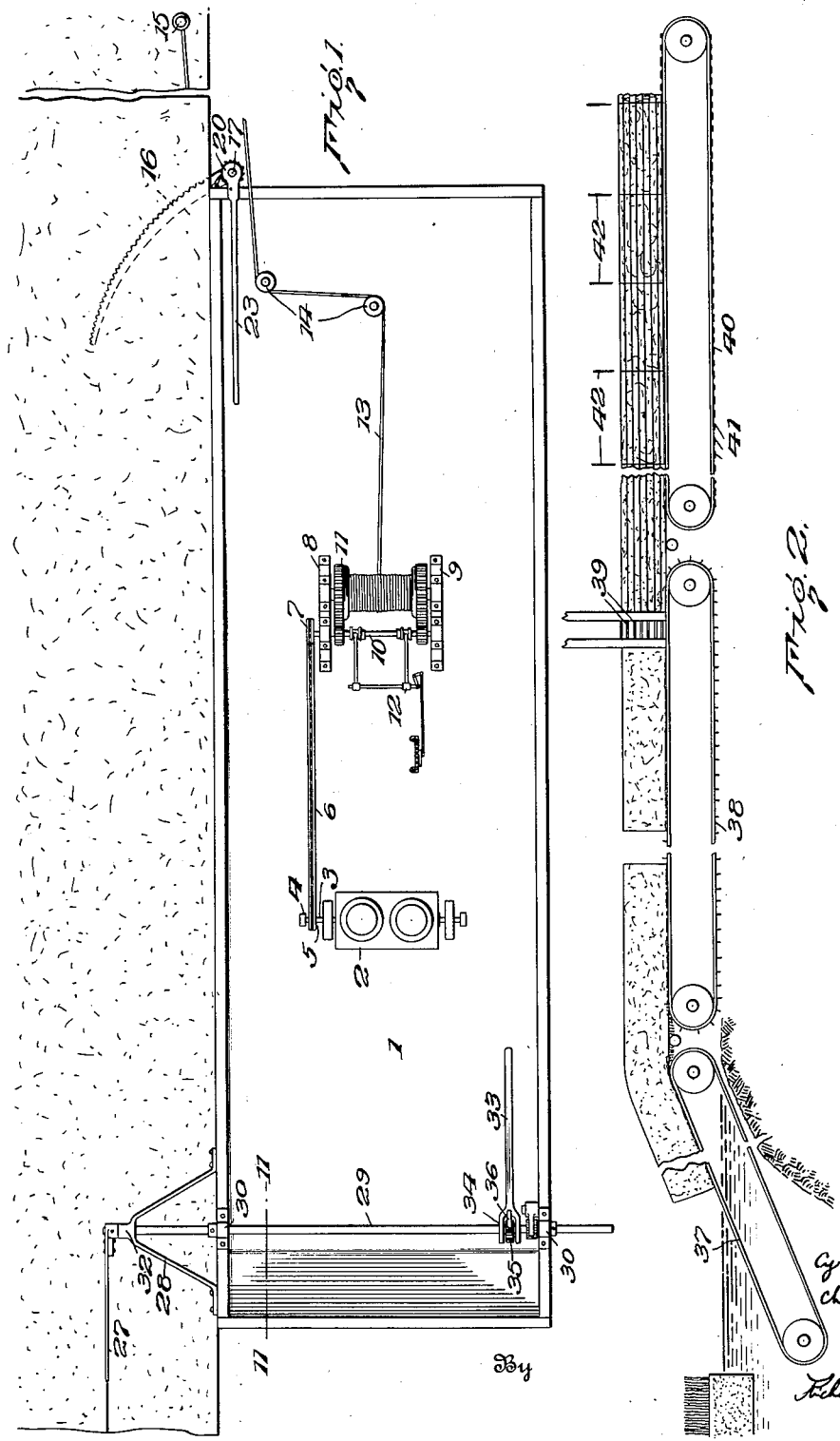

June 14, 1932.  C. F. LOGAN ET AL  1,863,329
INSULATING PRODUCT AND METHOD OF PRODUCING SAME
Filed Aug. 22, 1930   4 Sheets-Sheet 2
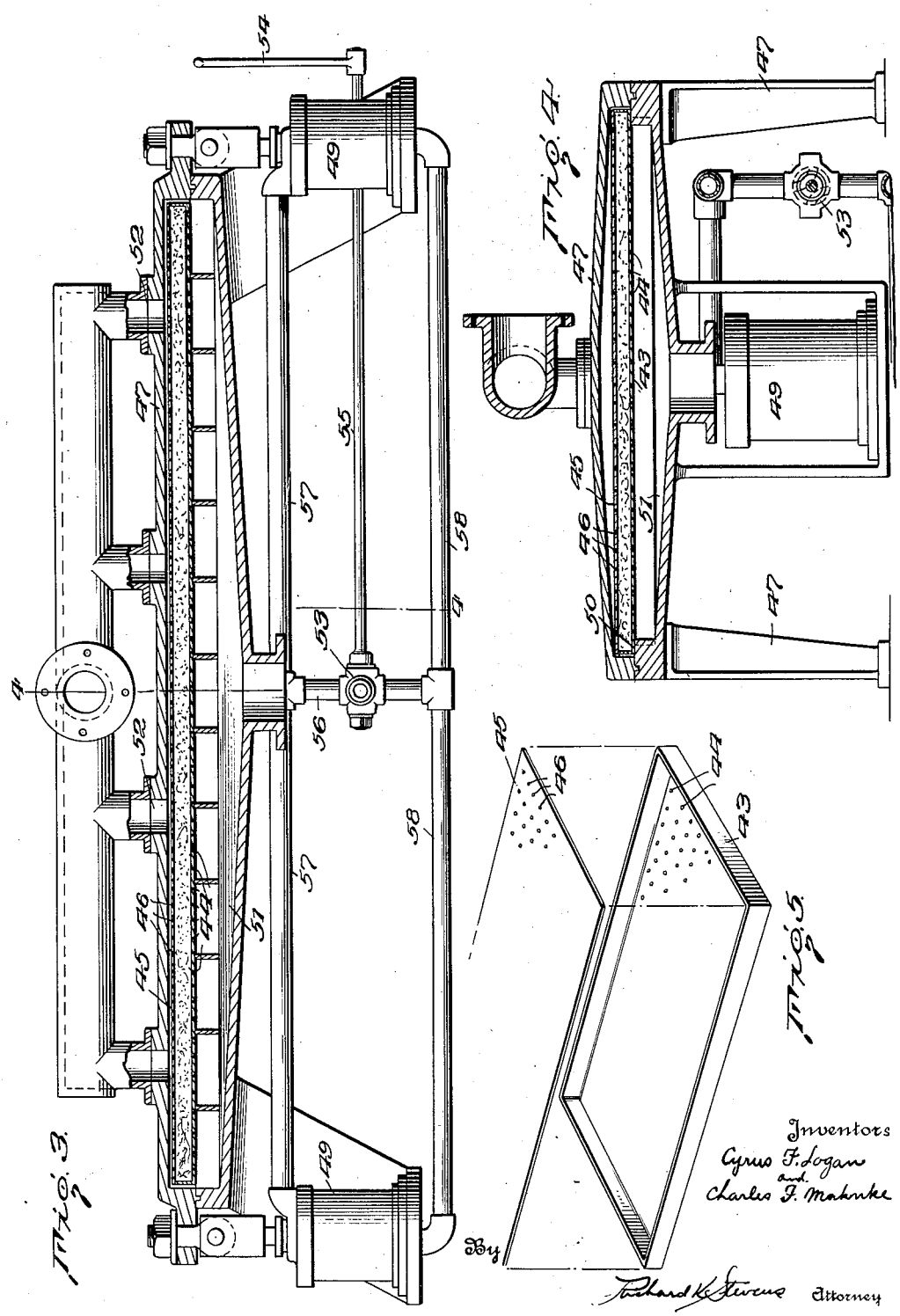

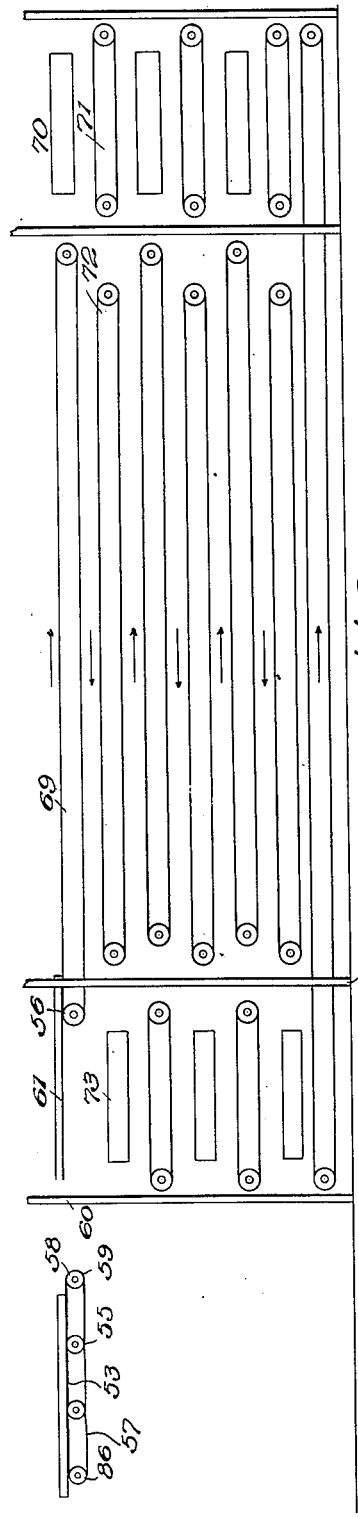

June 14, 1932.  C. F. LOGAN ET AL  1,863,329
INSULATING PRODUCT AND METHOD OF PRODUCING SAME
Filed Aug. 22, 1930  4 Sheets-Sheet 4
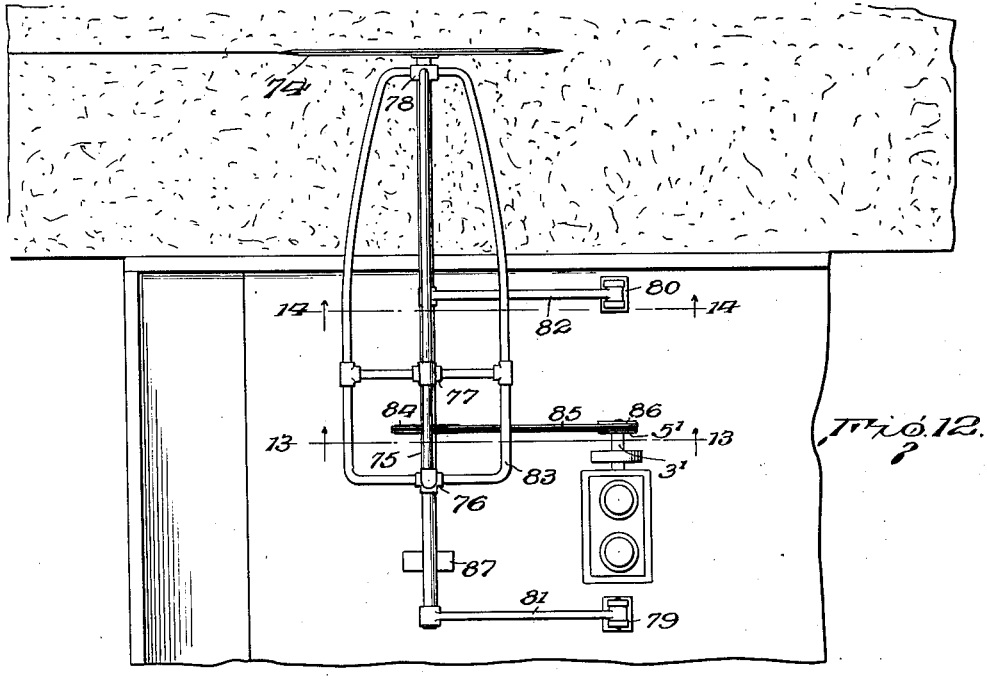
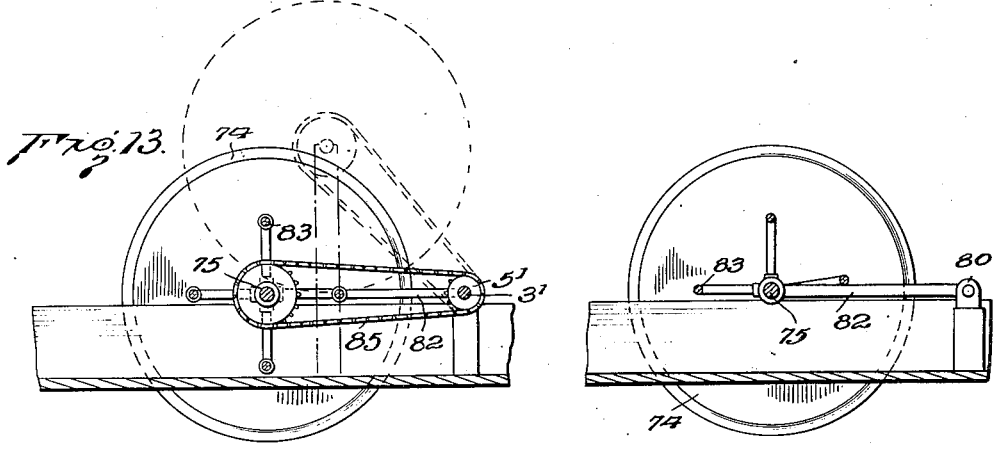
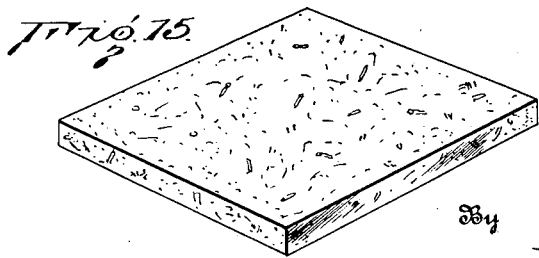
Inventor
Cyrus F. Logan
and
Charles F. Mahnke
By Richard K. Stevens
Attorney Patented June 14, 1932

1,863,329

UNITED STATES PATENT OFFICE

CYRUS F. LOGAN, OF WASHINGTON, DISTRICT OF COLUMBIA, AND CHARLES F. MAHNKE, OF MOOSE LAKE, MINNESOTA; SAID LOGAN ASSIGNOR TO SEDGE PRODUCTS COMPANY, OF PACKWAUKEE, WISCONSIN, A CORPORATION OF WISCONSIN

INSULATING PRODUCT AND METHOD OF PRODUCING SAME

Application filed August 22, 1930. Serial No. 477,178.

This invention relates to insulating structures, insulating material, a method of treating the material and apparatus for harvesting and conditioning the same, and more particularly the invention relates to a sedge root product having heat insulating qualities and the method of harvesting and treatment of the sedge.

It has been the custom to provide double walled structures for eliminating or retarding the exchange of heat from one side to the other thereof. In some instances the space between the walls has been evacuated in order that low conduction of heat be had through the same, while in other instances materials of low heat conducting properties have been used for filling the space between the walls, one of the most commonly used materials being cork, although numerous materials having voids or pockets therein have been manufactured for this purpose. Because of the expense and difficulty of obtaining the cork in desired size sheets, it has often been used in ground or loose bulk condition, but the handling of the same as well as the settling of the bulk in use caused the use of cork in this condition to prove quite inefficient.

The desirability of finding substitutes for cork and other insulating bodies which are difficult to handle and otherwise objectionable for insulating purposes has been recognized for some years, and many attempts have been made to produce an insulating material free of the objections of such materials, and which will be at least as satisfactory from the standpoint of non-conducting properties. As a result of these activities in seeking a more satisfactory material than cork and the like for insulation, many commercial insulating bodies have been produced and are now widely used in refrigerators, ovens, and similar constructions, and in many additional constructions such as insulating bodies for pipes, vats and the like, wherein it is desired to prevent the exchange of heat. However, so far as we are aware the use of such materials is objectionable because of the cost thereof, and the fact that they do not provide the desired degree of insulation.

We have discovered that certain portions of sedge root when properly shaped and treated overcome the difficulties noted above with respect to the various insulating materials produced. Sedge is a growing plant usually found floating on the surfaces of bodies of water, and it may be found upon the surface of water from one to thirty or more feet in depth. The sedge is particularly found in large quantities in the states of Wisconsin, Minnesota and Michigan, although various species of the plant are found in localities scattered throughout the world.

Harvesting of the sedge found in Wisconsin, Minnesota and Michigan shows that the plant grows upon the surface of the water, and that the water thereunder is normally partly displaced by the fine fiber which has settled from a growing root during the course of years. The fine fiber extends substantially to the bottom of the body of water and is in the form of a fluffy or semi-floating substance. The live root or fiber of the sedge normally extends only a relatively short distance into the water and it is of such a bouyant nature that a rise in the surface level of the body of water, such as occurs after a heavy rainfall causes the entire root mass to rise with the water level. Normally the growing root is matted and is capable of supporting a heavy weight when the weights are distributed over a relatively large area, such as the weight of a tractor when supported upon wide flanged wheels.

We have discovered that the live root when properly treated and incorporated in the structure is particularly suited for use as an insulating material for refrigerators and similar insulated chambers. Furthermore the material is particularly suited for the insulating of large vats, pipes and various machinery as well as for insulating the walls of buildings.

The invention contemplates the harvesting, shaping and treating of sedge material to form an insulating slab or sheet, and it is also an object of the invention to so treat the material as to render it sterilized, or at least free from living organisms.

It is further contemplated by the invention that the sedge be removed from its natural habitat in the form of precut slabs free of the fluffy under fibers.

An object of the invention is to provide equipment for cutting the slabs, the equipment being in the form of a boat positively propelled through the medium of a cable extending over the growing sedge and anchored, and in which vertical and horizontal cutting means are utilized to sever the growing sedges from the under fibers and to cut the slabs from the remaining growing sedge.

It is another object of the invention to harvest the sedge by cutting it in the desired shape, severing the under fibers and towing it to apparatus for removing the same from the water and slicing it in a plane transverse to the growing sedge grass into a series of slabs of the thickness desired in use. It is still another object of the invention to provide equipment for cutting the sliced sedge into desired lengths, cleaning and destroying organisms existing in the same and thereafter effecting a drying of the material whereby the slabs thus conditioned for use are free of the under fibers, free of the sedge grass, free of live organisms and of self sustaining form so as to permit them to be handled for forming into walls or for otherwise effecting a heat insulation.

It is an additional object of this invention to construct an insulating wall containing sedge root fibers.

Other objects and advantages will be apparent from the following detailed description when considered in connection with the accompanying drawings wherein:

Fig. 1 is a plan view of the harvesting boat illustrating the manner in which the knives are used to sever the growing sedge so that it may be towed from its natural habitat for treatment, Fig. 2 is a diagrammatic view of the conveyors for removing the cut sedge from the water, and the means for slicing the same into slabs of predetermined thickness, Fig. 3 is a longitudinal sectional view through the washing and steaming table, Fig. 4 is a transverse sectional view taken on line 4—4 of Fig. 3, Fig. 5 is a perspective view of the perforated tray and cover for retaining the slabs during treatment in the washing and steaming table, Fig. 6 is a diagrammatic view of the drier, Fig. 7 is a detailed sectional view illustrating the means of adjusting the horizontal harvesting knife, Fig. 8 is a sectional view taken on line 8—8 of Fig. 7, Fig. 9 is a detailed sectional view taken on line 9—9 of Fig. 7, Fig. 10 is a detailed sectional view taken on line 10—10 of Fig. 7, Fig. 11 is a detailed view of the vertical harvesting knife illustrated in Fig. 1, Fig. 12 illustrates a modified form of vertical harvesting knife, Fig. 13 is a sectional view taken on line 13—13 of Fig. 12, Fig. 14 is a detailed sectional view taken on line 14—14 of Fig. 12, and Fig. 15 is a perspective view of a harvested and treated slab ready for use as a self sustaining insulating medium.

Now considering the drawings in detail the numeral 1 designates a boat of usual flat bottom construction having a power plant 2, preferably in the form of an internal combustion engine, arranged near the center thereof. The engine is provided with a shaft 3 extending into an end bearing 4. Mounted on the shaft adjacent the end bearing is a sprocket wheel 5 over which a chain 6 is adapted to run. The chain 6 also passes over a sprocket 7 for supplying powder to a windlass mechanism. The windlass mechanism is mounted near the power plant 2 and is formed with bearing blocks 8 and 9 respectively. The sprocket 7 is mounted on a shaft 10 through the medium of which power is applied to the drum 11. The application of power to the drum 11 is controlled by means of clutch mechanism 12 which is diagrammatically illustrated.

A cable 13 which I have found in practicing the invention in Wisconsin should preferably be about 200 feet in length, is adapted to be wound upon the drum for propelling the boat. The cable passes over suitable snatch blocks 14 mounted adjacent the forward end of the boat so that when the end of the cable is fixed on shore as by anchor 15, the winding of the cable upon the drum will result in the propulsion of the boat with a tendency to draw the same inwardly along the sedge being cut.

As illustrated in Fig. 1, the boat is provided adjacent its forward end with a curved knife 16 having a serrated cutting edge. The knife 16 is horizontally positioned and is mounted to permit it to be swung under the boat in a complete circle. The knife is mounted on a shaft 17 by means of a clamp 18, and the shaft in turn is retained in free bearings 19. The upper end of the shaft 17 is provided with a bifurcated handle portion 20 which engages over the end of the shaft and has retained between the bifurcations a ratchet wheel 21 which is in turn fixed to the shaft. A dog 22 carried by the handle 23 is adapted to engage with the teeth of the ratchet wheel and to effect the movement of the knife in an arcuate path to the desired position. Another ratchet wheel fixed for movement with the shaft is preferably positioned below the bifurcations of the handle 20, and is adapted to be engaged by a dog pivoted to the boat wall for retaining the knife 16 in the adjusted angular position against the cutting pressure. The mounting of the shaft permits the vertical adjustment thereof due to the positioning of an adjustable collar 24, which is held in place after adjustment upon the shaft by means of a set screw 25. The collar rests upon a sleeve 26 loosely encircling the shaft, and the sleeve is in turn fixed in position by being attached to the side of the boat.

Arranged adjacent the stern of the boat is a vertical cutting knife 27 which knife is similar in construction to the knife 16 and is maintained in an adjusted predetermined spaced position from the side of the boat by a supporting bracket 28. A shaft 29 of sufficient length to permit the adjustment of the knife 27 supports the same at its outer end and extends through bearings 30 and 31 arranged on the sides of the boat. The shaft also extends through a bearing 32 arranged at the end of the bracket 28. A handle 33 provided with a bifurcated end is pivoted upon the shaft 29 at 34, and a ratchet wheel 35 is fixed to the shaft between the bifurcations of the handle. The handle is provided with a dog 36 for engaging with the teeth of the ratchet wheel to permit the arcuate adjustment of the knife 27 so that a vertical cut of desired depth may be made through the sedge and the sedge thereby severed to permit it to be towed to the location of the treatment apparatus hereinafter referred to. The angular adjustment of the knife 27 may be maintained by suitable ratchet wheel and dog construction or by any well known latching mechanism.

In utilizing the equipment thus far described for harvesting the sedge, the floating bog or sedge is approached from deep water. An edge of the sedge is straightened by cutting away any irregular portions such as usually exist in the naturally growing sedge. The cable 13 is wound off of the drum 11 and the anchor 15 is hooked into the bog a suitable distance from the portion being cut. The anchor is placed inwardly of the straightened edge so that upon operation of the power plant and movement of the drum to cause the winding of the cable thereupon, the boat will be drawn over against and along the straightened edge. The use of the snatch blocks 14 result in the cable being properly wound upon the drum notwithstanding the angular disposition of the anchor.

As the portion of the sedge to be treated is the live portion of the root above the under fibrous material, it is desired to harvest only the live root portion.

We have discovered that the portion most suited for use such as in insulating walls extends from about two inches below the grass portion down to a depth of from eight inches to two feet or more. The knife 16 is therefore adjusted to the proper depth depending upon the depth of the desired sedge in any particular harvesting operation, the adjustment being made by the movement of the collar 24 after loosening the set screw. The handle 23 is then moved and due to the engagement of the dog 22 with the teeth of the ratchet wheel 21 the knife 16 is caused to assume the desired angular position for cutting whereupon the lower ratchet wheel and dog will maintain the knife in the adjusted position. The knife 27 arranged at the stern of the boat is then disposed in the desired angular and spaced position depending upon the depth and width of cut desired, and the boat is drawn along the straight edge whereupon it is found that the undesirable fluffy under fibers have been severed from the live root by the knife 16, and a slab of the desired width has been cut away from the remaining growing sedge by the knife 27. The slab may be cut transversely by hand or other implements into the desired length and then floated out to deep water, and towed to the treating apparatus, or it may be otherwise conveyed to the treating apparatus, depending upon the location of the same.

When the sedge is floated to the location of the treating apparatus, it is placed in a pocket boom until such time as it can be floated slab by slab to a power derrick (not shown). The power derrick is used to turn each slab over in the water so that the sedge grass is on the lower side.

Each slab with the sedge grass lowermost is then floated upon a flat surfaced traveling conveyor 37, one end of which extends outwardly from the shore line and downwardly into the water. The conveyor is sufficiently long to permit the sedge to be floated thereupon without the employment of additional hoisting mechanism. The conveyor 37 is operated continuously from a suitable source of power (not shown) so that the sedge with the grass engaging the conveyor surface is drawn upwardly and out of the water.

As the sedge root is in the form of open or porous structure the surplus water present therein rapidly drains therefrom, although a part of the water remains. The slab is now transferred to a second conveyor 38 which is provided with a spiked or other non-slipping outer surface, and the sedge is therefore firmly engaged by and carried along by the conveyor. Because of the engagement of the slab with the conveyor surface, sufficient force is exerted upon the slab to cause it to be uniformly forced through a gang formation of horizontal cutting knives 39. In some operations a larger percentage of water may be drained or dried from the sedge root before the slabs are forced through the horizontal cutting knives 39 by air drying the same in the open for a period sufficient to condition them to the desired extent. We have discovered that the horizontal cutting of the slabs which results in the main roots extending in the direction of shortest dimension of the blocks causes the air pockets which exist at intervals along the main roots to be spaced quite regularly with the result that the blocks are of improved insulating value. As the specific construction of the conveyors and cutting knives will form the subject matter of a separate application, it is thought only essential in this application to describe the method of treating the sedge in the apparatus together with the general description of said apparatus.

It will suffice to state that the individual knives of the gang 39 are arranged horizontally and are reciprocated by a power driven crank in order that a stroke of from one to two feet may be had. The knives of the gang 39 may be adjustably mounted with respect to each other to permit the horizontal cutting of the slab to form strips of any desired thickness.

After the slab has been forced through the knife gang 39, it is passed in the cut condition to a conveyor 40 formed with a flat bed provided with cross slats 41. A series of cutting knives 42 illustrated diagrammatically, are mounted above the conveyor 40 and each of these knives is formed with a serrated edge. The power operating mechanism for the conveyor 40 causes the conveyor to operate intermittently in order that, when the conveyor comes to rest with the cut slab thereon, the series of knives 42 which extend transversely of the slab can be brought down by hand power and given an oscillating or reciprocating motion to cause the severance of the slab into a number of lengths of such dimension as may be fixed by the setting of the knives of the series with respect to each other.

The sheets cut from the slab which are now of the desired dimension due to the action of the series of knives 42, and the action of the harvesting knife 27, they having been cut in predetermined thickness by the gang knives 39, are subjected to steaming and washing. Each sheet is placed in a tray 43, preferably formed of metal and perforated as at 44. A plate 45 constituting a closure for the open side of the tray also preferably of metal, and perforated as at 46, is placed against the sheet in the tray and the loaded tray is placed in a steaming table 47 as illustrated in Figs. 3 and 4. The sheet is then subjected to the action of hot steam, first to destroy vegetation and insect life and to kill other living organisms; secondly, to wash and drive out any fine silt or dust that may exist in the sheet; and thirdly, to heat up the mass to the boiling point before it is passed to a hot air drier hereinafter referred to. The employment of steam or other hot gases to destroy vegetation and insect life likewise renders extinct the reproductive ability of the sedge root itself.

The table 47 is provided with a cover 48 which is lifted by means of hydraulic piston mechanism 49. After the tray with the sheet therein is placed upon the flange 50 within the chamber 51 of the table, the cover 48 is lowered and pressure is placed upon the upper side of the piston in the hydraulic piston mechanism 49 to maintain the cover down upon the table, without bolts or other fastening mechanism. The cover is maintained closed in this manner even during the steaming operation of the sheet within the table. We have found it most advantageous to subject the sheet to steam pressure not exceeding 12 pounds per square inch. The plate 45 of the tray 43 is closed or non-perforated directly in line with the steam inlet opening 52 in the cover 48 of the table in order to prevent the steam from impinging directly on the sedge material.

In order to effect the raising or lowering of the cover 48 by the operation of the hydraulic mechanism 49 a four-way plug cock 53 is provided which is operable by means of a lever 54 through the medium of a rotatable shaft 55. It will, therefore, be clear that the pistons within the hydraulic mechanism are caused to be moved to elevate the cover 48 or to hold the same in closed position. The four-way plug cock 53 is in a pipe 56, the upper end of which is connected by means of pipes 57 to the upper part of the respective cylinders of the hydraulic mechanism so that fluid delivered through the pipes 57 will maintain the cover in the closed position. When it is desired to elevate the cover the lever 54 is operated to cause the flow of fluid through pipes 58 which are connected to the lower portion of the cylinders of the hydraulic mechanism, and thereby the pistons are raised to cause the corresponding movement of the cover 48.

As the sedge slabs may be in a rather wet state before entering the table the action of the steam pressure under such conditions drives out a large percentage of the water thus leaving the material in a semi-dry state and at a relative high temperature.

To assist in the driving out of the water and silt a vacuum pump (not shown) may be attached to the underside of the table in communication with the chamber 51.

After the steam pressure has been applied to the sheet for about two minutes the cover of the table is raised by reversing the position of the four-way cock as set forth above, and by leaving the four-way cock in this position the pressure of the water will maintain the cover in the raised position. The highly heated sedge sheet in the tray is then transferred to an elevator 59 forming a part of a hot air drier mechanism 60. As the preferred hot air drier mechanism 60 will form a part of another application, it is believed sufficient to illustrate the drier diagrammatically, and the method in which the sheets are passed through the drier, without illustrating specifically the detailed mechanism thereof.

The elevator 59 has its floor constructed of a plurality of iron rolls 61 all of which are geared together by sprockets 62 arranged at their ends and chains 63 passing thereover. The end roller 64 of the elevator floor which is adjacent the drying mechanism 60 is provided with spur pinions 65 on each end thereof. The spur pinions when the elevator is in the uppermost position engage constantly rotating spur gears 66 and thereby the end roller with the remaining rollers of the floor geared thereto by the sprocket chain causes the elevator to convey the sedge material in the tray 43 on to constantly rotating rollers 67 which are rotating in the same direction and which causes the tray to be moved into the drying chamber proper indicated at 68.

Within the chamber 68 which is preferably closed with metallic plates and insulated to prevent the loss of heat therefrom are a series of conveyors. These conveyors may be of any well known form but preferably support the material in the tray at points adjacent the edges thereof so as to permit a free circulation of heated air therearound. Each tray with the sedge sheet thereon as it is delivered from the elevator passes on to an upper conveyor 69 and is discharged from the end thereof upon an escalator 70. The escalator permits the timed descent of the tray 53 to a conveyor 71 and the conveyor 71 causes the tray to be passed to a second main conveyor 72 which in turn deposits the tray upon an escalator or other appropriate lowering means 73. The operation through the drier is continued in this manner by passing from one conveyor to an escalator and then being lowered and delivered to the next lower conveyor throughout the entire drying operation, and is then discharged therefrom. The escalator rolls are maintained in position until the tray is delivered entirely thereupon and can be lowered to a proper position for further passage through a drier before the escalator is operated to effect the lowering of a given tray.

Hot air is employed as the drying medium and it is preferably produced by a steam manifold or by oil burning heaters. The chamber 68 may be divided into as many longitudinal compartments as desired by the use of horizontally arranged division plates. By such construction the hot air from the heater will enter at one end and travel over and under the tiers in the particular compartment and is then passed through the escalator chamber which acts as a flue into the next adjacent upper compartment. The hot air then travels in a reverse direction through the second compartment where it is permitted to escape. At the point of discharge from the first main compartment the air may be diverted to cause it to pass to a point for further heating where it will become a superheated steam because of the moisture contained therein, and be at a higher temperature after reheating. We have found that by so treating the drying air the material in the second compartment will dry faster than when the normal drying air is permitted to pass directly from the first compartment to the second.

The sedge will be passed through the drier at speeds variable according to the thickness of the sheets being dried. It is preferable to dry sheets of the same thickness during one drying operation and if sheets of another thickness are then to be dried, to adjust the change speed gear for the drier to cause the speed of travel therethrough to be varied in accordance with the thickness of the sheets being dried during the particular operation. The sheets to be dried normally range from one inch to six inches in thickness, the one inch sheets passing through the drier in about one hour while the six inch sheets require about ten hours. Sheets of intermediate thickness require a proportionate time, the temperature of the drying air being maintained at the point of discharge of the material not lower than 212° F. and normally at approximately 215° F. If the drying air is reheated it may be maintained at a much higher temperature as the hot moist air will not cause the destruction of the sheet. A temperature of 230° F. is therefore not prohibitive when the drying air is reheated.

After the dry material is discharged from the drier it is then passed through a double roll sanding machine which smooths the surface thereof. The dry material is thereafter trimmed and cut to size and is ready for use.

Figs. 12, 13 and 14 illustrate a modified form of vertical cutting knife. In this form the knife 74 is constructed as a rotary disk knife. The knife is mounted on the end of a shaft 75, which shaft is journaled in bearings 76, 77 and 78. The shaft and knife are adapted to swing in an arcuate path about a pivot point in actual alignment with the internal combustion engine shaft 3', by means of brackets 79 and 80 respectively in which bars 81 and 82 are pivoted. The free ends of the bars 81 and 82 are secured to a structure 83 which in turn carries the bearings 76, 77 and 78 for the shaft 75. Fixedly mounted on the shaft 75 is a sprocket 84 over which a chain 85 passes. The chain 85 in turn passes over a sprocket 86 on the internal combustion engine shaft 3'. A stop 87 is provided to prevent the straining of the bracket and shaft, the upper surface of which stop is in alignment with the upper surface of the side of the boat. It will be readily seen that in the operation of the knife 74, it is swung to operating position as illustrated, and is then caused to be rotated upon operation of the internal combustion engine through the medium of the shaft 75 and the sprockets 84 and 86 with their chain 85. In the modification shown in Figs. 12, 13 and 14, the internal combustion engine is utilized to supply power to the windlass mechanism through the medium of a sprocket wheel 5' in the same manner as that illustrated in Fig. 1.

Specific tests with respect to the properties of the product of this invention have been made with the following results:—

*Physical properties of sedge insulation*

1. Density-pounds per cubic foot-average 7.1
   No. 1__ 6.88 (used for thermal conductivity tests)
   No. 2__ 7.2
   No. 3__ 7.1
   No. 2__ 7.8
2. Thermal conductivity—
   Tests made on sample No. 1 having a density of 6.88 pounds per cubic foot.
   at 70° F.=0.24 (extrapolated) B. t. u. per hour per sq. ft. per deg. F.
   at 143° F.=0.328 (experimental) per inch of thickness
   at 222° F.=0.426 (experimental)
3. Heat transmission coefficients of sedge.
   For vertical surfaces
   Density 6.88 pounds per cubic foot
   Average temperature of peat given
   Thickness of paper used for carton=.0145 inch

| Thickness of sedges (inches) | at 70° F. No carton | at 70° F. With carton | at 120° F. No carton | at 120° F. With carton | at 160° F. No carton | at 160° F. With carton |
|---|---|---|---|---|---|---|
| ½ | .35 | .332 | .412 | .40 | .458 | .428 |
| 1 | .202 | .196 | .246 | .235 | .275 | .264 |
| 1½ | .143 | .139 | .173 | .169 | .197 | .192 |
| 2 | .110 | .108 | .135 | .139 | .154 | .150 |
| 2½ | .190 | .088 | .110 | .108 | .126 | .124 |
| 3 | .075 | .075 | .093 | .092 | .107 | .105 |
| 3½ | .065 | .065 | .081 | .080 | .093 | .091 |
| 4 | .057 | .057 | .071 | .070 | .082 | .081 |
| 5 | .046 | .046 | .057 | .057 | .066 | .066 |
| 6 | .039 | .039 | .048 | .048 | .055 | .055 |

Transmission coefficients given in B. t. u. per hour per square foot per degree Fahrenheit difference in temperature of air on opposite sides of insulation.

Transmission coefficient of vertical air film (natural convection) = 2.57
Transmission coefficient of paper used on cartons (one thickness) = 13.0
Thermal conductivity of peat in B. t. u. per hour per sq. ft. per inch of thickness.
at 70° F.=0.24
at 120° F.=0.30
at 160° F.=0.35

In order to produce an insulating wall or area the confining substance may be in the form of a plastic composition, depending upon the proper spacing and maintenance of the plastic material by the structure of the treated sedge root itself, or the sedge root may be incorporated between metallic, wooden or other confining material.

What we claim is:—

1. A block of insulating material comprising dried naturally matted and intertangled and tightly interlaced fibers formed only from the live root portions of the water sedge, in which the main roots extend in the direction of shortest dimension of the block, and in which the reproductive ability of said dried root portions has been rendered extinct.

2. A block of insulating material comprising dried naturally matted and intertangled and tightly interlaced fibers formed only from the live root portions of the water sedge and which is sterile in the sense that it will not sprout and become reproductive when subjected to moisture.

3. A block of insulating material comprising a dried naturally matted and intertangled and tightly interlaced fibers formed only from the live root portions of the water sedge wherein the main roots extend in the direction of the shortest dimension of the block.

4. The method of preparing a heat insulating body which comprises severing the growing root of sedge from the underroot and a strip or block including the growing sedge from that sedge remaining in the natural habitat, cutting the severed strip or block into slabs of desired length and thickness in a direction transverse to the main roots, rendering extinct the reproductive ability of said severed root by subjecting the same to the action of steam sufficient to destroy the reproductive ability, and rendering the sedge root of high insulating value by drying to substantially remove the water at some period after steaming the same.

5. The method of producing a heat insulating body which comprises severing the growing root of the water sedge from the underroot and from that sedge remaining in the natural habitat, removing water from the severed root, forming slabs of desired length and thickness from said growing root by severing the same transverse to the direction of the growth of the sedge grass so that the main roots extend in the direction of shortest dimension of the slabs, and rendering the slabs of high insulating value by further drying the same to substantially remove the moisture remaining in said slabs.

In testimony whereof we affix our signatures.

CYRUS F. LOGAN.
CHARLES F. MAHNKE.